(12) United States Patent (10) Patent No.: US 8,559,533 B2
Brisebois et al. (45) Date of Patent: Oct. 15, 2013

(54) SYSTEM AND METHOD FOR SELECTING WIRELESS SIGNAL BANDWIDTH BASED ON SIGNAL STRENGTH MEASUREMENTS PROVIDED BY WIRELESS RECEIVERS

(75) Inventors: Arthur Richard Brisebois, Lunenburg, MA (US); Paritosh Rai, Antonio, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 1007 days.

(21) Appl. No.: 12/617,013

(22) Filed: Nov. 12, 2009

(65) Prior Publication Data

US 2010/0054308 A1 Mar. 4, 2010

Related U.S. Application Data

(63) Continuation of application No. 11/152,370, filed on Jun. 15, 2005, now Pat. No. 7,639,727.

(60) Provisional application No. 60/615,575, filed on Oct. 5, 2004.

(51) Int. Cl.
*H04L 27/00* (2006.01)
*H04L 23/00* (2006.01)

(52) U.S. Cl.
USPC .......................................... 375/259; 375/377

(58) Field of Classification Search
USPC ......... 375/130, 132, 133, 259, 260, 316, 377, 375/224, 227; 455/403, 435.1, 422.1, 434, 455/450, 452.2; 370/310, 328, 329, 336, 370/337, 431, 436
See application file for complete search history.

(56) References Cited

U.S. PATENT DOCUMENTS

| | | |
|---|---|---|
| 5,038,399 A | 8/1991 | Bruckert |
| 5,557,657 A | 9/1996 | Barnett |
| 5,937,002 A | 8/1999 | Andersson et al. |
| 5,940,439 A | 8/1999 | Kleider et al. |
| 5,974,106 A | 10/1999 | Dupont et al. |
| 6,091,955 A | 7/2000 | Aalto et al. |
| 6,108,374 A | 8/2000 | Balachandran et al. |
| 6,268,828 B1 | 7/2001 | Martek |
| 6,529,730 B1 | 3/2003 | Komaili et al. |

(Continued)

OTHER PUBLICATIONS

Nielsen, et al. "On the Capacity of a GSM Frequency Hopping Network with Intelligent Underlay-Overlay." IEEE 47th Vehicular Technology Conference, vol. 3, May 4-7, 1997, pp. 1867-1871.

(Continued)

*Primary Examiner* — Tesfaldet Bocure
(74) *Attorney, Agent, or Firm* — Turocy & Watson, LLP

(57) ABSTRACT

A method and system are provided which combine (i) adaptive multi-rate half-rate transmission and (ii) intelligent frequency hopping wherein frequency hopping and intelligent underlay overlay are used simultaneously. In the latter, frequency hopping is controlled on a frequency group by frequency group basis, and one frequency hopping group is made up of one or more regular transmitters of a cell and another frequency hopping group is made up of one or more super reuse (super layer) transmitters of the cell. A wireless terminal (e.g., handset) is used in determining the carrier to interference (C/I) ratio for a received signal. A determination is then made as to whether the C/I ratio is acceptable for super layer transmission, and, if the ratio is acceptable, a super reuse transmitter operating in the superlayer range at the half-rate transmission rate is used to transmit a call to the terminal.

20 Claims, 4 Drawing Sheets

(56) References Cited

U.S. PATENT DOCUMENTS

| | | |
|---|---|---|
| 6,799,044 B1 | 9/2004 | Wesby et al. |
| 6,985,736 B1 | 1/2006 | Aalto |
| 7,136,638 B2 | 11/2006 | Wacker et al. |
| 7,164,710 B2 | 1/2007 | Komaili et al. |
| 7,227,888 B2 | 6/2007 | Lemieux |
| 7,236,789 B2 | 6/2007 | Balachandran et al. |
| 7,242,362 B2 | 7/2007 | Hulkkonen et al. |
| 7,328,038 B2 | 2/2008 | Hellwig et al. |
| 7,346,130 B2 | 3/2008 | Kobylinski et al. |
| 2003/0050071 A1 | 3/2003 | Shurvinton |
| 2004/0057402 A1* | 3/2004 | Ramos et al. ................. 370/329 |
| 2004/0229651 A1 | 11/2004 | Hulkkonen et al. |

OTHER PUBLICATIONS

Wigard, et al. "Improved Intelligent Underlay-Overlay Combined with Frequency Hopping in GSM." The 8th IEEE International Symposium on Personal, Indoor and Mobile Radio Communications, vol. 2, Sep. 1-4, 1997, pp. 376-380. 'Waves of the Year 2000'. PIMRC '97.
OA dated Oct. 31, 2008 for U.S. Appl. No. 11/152,370, 15 pages.
OA dated May 21, 2008 for U.S. Appl. No. 11/152,370, 15 pages.
OA dated Feb. 13, 2009 for U.S. Appl. No. 11/152,370, 12 pages.
OA dated Apr. 6, 2009 for U.S. Appl. No. 11/152,370, 13 pages.

* cited by examiner

SYSTEM AND METHOD FOR SELECTING WIRELESS SIGNAL BANDWIDTH BASED ON SIGNAL STRENGTH MEASUREMENTS PROVIDED BY WIRELESS RECEIVERS

CROSS REFERENCE TO RELATED APPLICATIONS

This application is a continuation of U.S. patent application Ser. No. 11/152,370, filed on Jun. 15, 2005, entitled "SYSTEM AND METHOD FOR SELECTING WIRELESS SIGNAL BANDWIDTH BASED ON SIGNAL STRENGTH MEASUREMENTS PROVIDED BY WIRELESS RECEIVERS", now issued as U.S. Pat. No. 7,639,727 on Dec. 29, 2009, which claims benefit of and priority to U.S. Provisional Patent Application Ser. No. 60/615,575, filed on Oct. 5, 2004, the entireties of which are incorporated herein by reference.

BACKGROUND OF THE INVENTION

1. Field of the Invention

The present invention relates to the field of determining transmission signal bandwidth for wireless network communications.

2. Description of the Related Art

Wireless frequency availability and signal bandwidth are critical to maximization of wireless telecommunications capabilities. A wireless network has a limited bandwidth and number of frequencies available for wireless telecommunications. As demand for wireless network services has increased, it has become necessary to provide as much bandwidth and the maximum number of frequencies in each wireless network cell and sector.

The present state of the art in wireless communications provides various techniques for maximizing bandwidth and frequency use. Generally, however, these techniques are dependent upon the strength and characteristics of the signal as received by the wireless device. If the signals are not strong and clear, then a broader bandwidth or a different frequency may be required in order to assure reliable communications with the wireless device and avoid interference.

As discussed below, embodiments of the present invention are based, in part, on a combination of two existing technologies. These technologies are discussed below.

SUMMARY OF THE INVENTION

In accordance with embodiments of the invention, a method and system are provided which combine the hardware and cost efficiency of Adaptive Multi-Rate (AMR) Half-Rate (HR) with the spectrum efficiency and predictability of Intelligent Frequency Hopping (IFH), two technologies that are described in more detail hereinafter. In one important implementation, efficient half-rate transmissions are applied to the super layer, and such application is based on, and protected by, the carrier to interference (C/I) ratio prediction and layer determination mechanisms of IFH. In this implementation, full-rate transmissions are applied to the regular layer, and are used to serve areas where the IFH mechanism determines that radio conditions (e.g., the C/I ratio) are inadequate for AMR half-rate. (It is noted that the terms super, super reuse, super layer and underlay are often used interchangeably, as are regular layer and overlay; the terms super layer and regular layer are used herein and are discussed in more detail below.) As with IFH, in this implementation of the invention, the transmitter resources are divided the super and regular layers but the super layer half-rate transmitters are able to serve twice as many calls. In such an implementation, the doubling of super layer transmission capacity offsets the trunking efficiency loss of layer subdivision, and significantly improves overall hardware efficiency. It is noted that super layer and regular layer transmissions use the same number of hopping frequencies and because scarce frequency resources are not subdivided between layers, spectrum efficiency is optimized with this implementation.

An important feature of this implementation is that calls are applied to half-rate under all loading conditions and not just during peak-usage periods. The method and system of this implementation (i) check radio conditions (and, in a preferred embodiment, check the C/I ratio), before applying calls to half-rate, whereas conventional packing does not, and (ii) proactively places calls on half-rate whenever these conditions are met, whereas conventional packing waits until the available resources are near congestion.

In general, as is described in more detail below, the method and system of preferred embodiments of the invention, among other advantages, provide a more consistent half-rate call quality, proactively reduce interference, thereby improving overall capacity and performance, and deliver higher half-rate absorption and cost savings.

In accordance with one aspect of the invention, there is provided a method for selecting a wireless signal bandwidth for wireless communication with a wireless terminal in a system comprising a plurality of cells each including at least one regular layer frequency hopping transmitter and at least one super layer transmitter frequency hopping transmitter, and wherein at least first and second transmission rates are available, the second transmission rate serving more calls using a single transmitter than the first transmission rate for the same transmitter, the method comprising the steps of:

measuring signal strength of a received signal using the wireless terminal and producing a relative signal strength measurement based at least in part thereon;

determining whether said relative signal strength measurement is within a predetermined threshold consistent with super layer operation; and if the relative signal strength measurement is not within said threshold, providing transmission to the wireless terminal at the first transmission rate using the at least regular layer transmitter, and if the relative signal strength measurement is within said threshold, providing transmission to the wireless terminal at a second transmission rate using the at least one super layer transmitter.

Preferably, the first and second transmission rates comprise full-rate transmission and half-rate transmission.

The step of measuring relative signal strength preferably comprises determining a carrier to interference ratio for the received signal.

Advantageously, at least two super layer transmitters are provided at each cell.

Preferably, the measuring step is carried out continuously, and, if a current relative signal strength measurement is not within the predetermined threshold after formerly being within the predetermined threshold, transmission is switched to transmission at the first transmission rate using the at least one regular layer transmitter.

According to a further aspect of the invention, there is provided a method combining (i) adaptive multi-rate half-rate transmission and (ii) intelligent frequency hopping wherein frequency hopping and intelligent underlay overlay are used simultaneously, wherein, in a base controller, frequency hopping is controlled on a frequency group by frequency group basis, and wherein a frequency hopping group comprises at least one regular transmitter of a cell and another frequency hopping group comprises at least one super reuse transmitter of the cell, the method comprising the steps of:

using a wireless terminal in determining a carrier to interference ratio for a signal received thereby;

determining whether the ratio is acceptable for super layer transmission; and if the ratio is acceptable, using the at least one super reuse transmitter to transmit in a superlayer range at the adaptive multi-rate half-rate transmission rate and if the ratio is not acceptable, using the at least one regular transmitter to transmit in a regular layer range at a full rate transmission rate.

Preferably, the determining step comprises determining whether the carrier to interference ratio is within a predetermined threshold.

Preferably, the measuring step is carried out continuously, and, if a currently determined carrier to interference ratio is not within the predetermined threshold after formerly being within the predetermined threshold, transmission is switched to transmission at the first transmission rate using the at least one regular transmitter.

In accordance with another aspect of the invention, there is provided a method for controlling call placement to a wireless terminal in a system that comprises a plurality of cells each including at least one regular layer frequency hopping transmitter and at least one super layer frequency hopping transmitter and wherein adaptive multi-rate half-rate transmission is available, the method comprising the steps of:

using the wireless terminal in providing a carrier to interference ratio measurement with respect to a signal received by the wireless terminal;

determining whether the carrier to interference measurement meets predetermined conditions indicating acceptability for super layer transmission; and if said predetermined conditions are met, using the at least one super layer transmitter to place a call to the wireless terminal using adaptive multi-rate half-rate transmission.

Preferably, the determining step comprises determining whether the carrier to interference ratio is within a predetermined threshold.

Preferably, carrier to interference ratio measured is carried out on a continuous basis, and, if a current measurement is not within the predetermined threshold after formerly being within the predetermined threshold, the call is switched to transmission at a full-rate transmission rate using the at least one regular layer transmitter.

According to yet another aspect of the invention, there is provided a wireless communication system comprising:

a plurality of cells each including at least one regular layer frequency hopping transmitter and at least one super layer frequency hopping transmitter, and at least one wireless terminal for measuring relative signal strength of a received signal;

said cells each further comprising a cell tower for receiving incoming calls and a controller for controlling switching between the at least one regular layer transmitter and the at least one super layer transmitter based on whether the measured relative signal strength of the received signal meets at least one predetermined condition relating to acceptability for super layer transmission, and for, when said at least one condition is met, providing for switching to the at least one super layer transmitter and for transmission of a call to the wireless terminal from the at least one super layer transmitter at an adaptive multi-layer half-rate.

Advantageously, the system comprises at least two super layer frequency hopping terminals.

Preferably, the controller controls said switching based on whether the measured relative signal strength exceeds a predetermined threshold.

Preferably, a carrier to interference ratio is determined for the received signal and the controller controls switching between transmitters based on whether the ratio exceeds a predetermined threshold.

Preferably, the wireless terminal continuously measures relative signal strength, and, if a current relative signal strength measurement no longer exceeds the predetermined threshold after formerly exceeding said threshold, the controller provides for switching to transmission of the call at a full-rate transmission rate using the at least one regular layer transmitter.

According to still another aspect of the invention, there is provided a computer-readable medium having computer executable instructions stored thereon for performing a method for controlling call placement to a wireless terminal in a system that comprises a plurality of cells each including at least one regular layer frequency hopping transmitter and at least one super layer frequency hopping transmitter and wherein adaptive multi-rate half-rate transmission is available, the method comprising the steps of:

receiving an input comprising a carrier to interference ratio based on relative signal strength measurements made by the wireless terminal;

determining whether the carrier to interference ratio meets predetermined condition indicating acceptability for super layer transmission; and if the predetermined conditions are met, providing for use of the at least one super layer transmitter to place a call to the wireless terminal using adaptive multi-rate half-rate transmission.

Preferably, the predetermined conditions include whether the ratio exceeds a predetermined threshold, and if the ratio no longer exceeds the predetermined threshold, providing switching to transmission of the call using the at least one regular layer transmitter transmitting at a full-rate transmission rate.

Further features and advantages of the present invention will be set forth in, or apparent from, the detailed description of preferred embodiments thereof which follows.

DETAILED DESCRIPTION OF THE INVENTION

Figure 1:
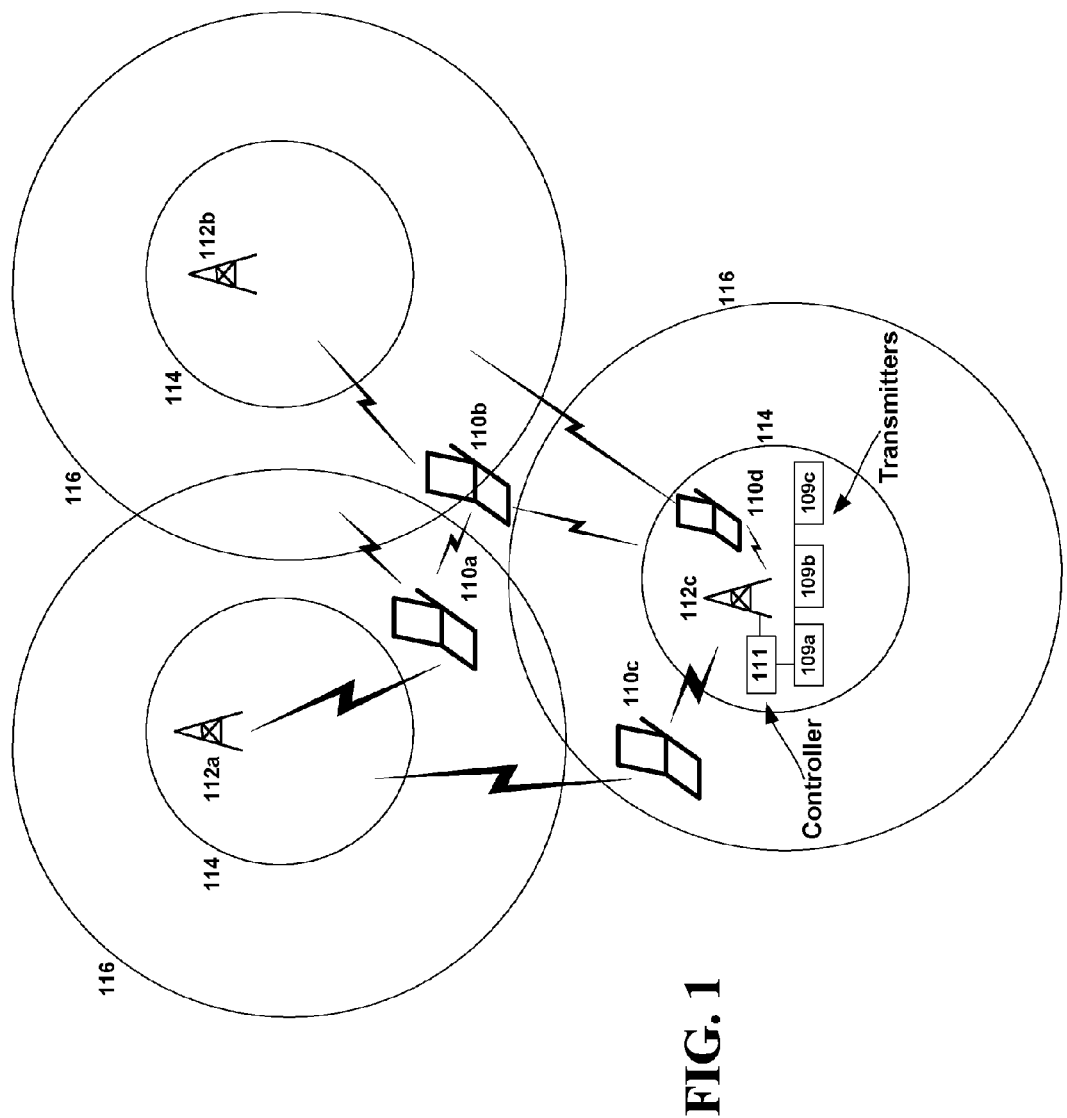
FIG. 1 is a schematic diagram of a wireless network used in explanation of one aspect of the present invention.

Exemplary embodiments of the present invention will now be described in detail by reference to the drawings. In referring to the drawings, the numbered components described herein refer to like numbered components depicted in the drawings.

Referring to FIG. 1, a wireless cellular network 100 is shown. In an exemplary embodiment of the system and method of the present invention, the network 100 provides a combination or selection of transmission systems and methods appropriate for the specific wireless communication links based on the measurement of relative signal strength and in particular, carrier to interference ratio. As indicated above, these systems and methods include, but are not limited to, intelligent frequency hopping (IFH) and adaptive multi-rate (AMR) half rate (HR). These methods are combined in the manner described herein, to form what is referred to herein, for shorthand purposes, as an Intelligent Packing Half rate (IPH) system. As mentioned above and is described below, this system delivers superior service quality, and superior hardware and spectrum efficiency. Before considering FIG. 1 in more detail, IFH will first be described.

Considering IFH in more detail, IFH is a system (and associated method) which is designed to improve spectrum efficiency and capacity. The system is referred to as intelligent frequency hopping because frequency hopping (FH) and intelligent underlay overlay (IUO) are used simultaneously to improve the capacity of the radio network. When the IUO feature is deployed in the base station controller, frequency hopping is controlled on a frequency group by frequency group basis. Regular transmitters of the cell compose one hopping group and super reuse transmitters of the cell compose another hopping group. Frequency hopping can be used independently in these two groups. The following is a brief description of the two techniques that comprise IFH, viz., frequency hopping and IUO.

Frequency hopping can briefly be described as a sequential change of carrier frequency on the radio link between the mobile terminal and the base station. When frequency hopping is used in TDMA, for example, the carrier frequency is changed between each consecutive TDMA frame. This means that, for each connection, the change of the frequency may happen between every burst. Frequency hopping also provides some additional benefits such as frequency and interference diversity.

Intelligent underlay-overlay (IUO) is designed to allow the operator to reuse frequencies very aggressively in order to achieve higher radio network capacity. To avoid interference caused by aggressive frequency reuse, the base station controller (BSC) estimates the degree of interference on different frequencies and directs the mobile stations to those frequencies that are clean enough to sustain a good radio connection quality.

Turning again to FIG. 1, wireless cellular network 100 includes wireless terminals, i.e., receivers or handsets, 110a, 110b and 110c. It will, of course, be understood that the number of receivers or handsets can be much greater than the three shown. Three cell towers or cell sites 112a, 112b and 112c are also shown. Again, it will be appreciated that the number shown is arbitrary. The wireless receivers 110a, 110b and 110c are shown as being cellular phones. However, it will be understood by one skilled in the art that wireless receivers could also be other forms of wireless communications devices including, but not limited to, wireless pagers or computers (including PDAs and laptop computers).

As indicated above, FIG. 1 is presented as an aid to understand certain aspects of the invention. In this regard, super layers 114 are shown which surround the respective cell sites 112a, 112b and 112c, while regular layers 116 are also shown which surround the respective super layers 114. The super layers 114 serve the inner regions of the cell sites 112a, 112b and 112c of network 100 where there is little or no interference with the signal transmission that occurs between a wireless receiver and a corresponding transmitter.

As mentioned above and is explained below, in accordance with one aspect of the invention, signal transmissions occurring within a super layer 114 are transmitted at half rate, but transmission can take place in the respective super layer 114 only if the corresponding carrier to interference (C/I) ratio for the signal is within a given range and, more particularly, above a predetermined level. Due to the nature of a super layer 114, an area serviced by the layer will have clear dominance over an area serviced by the associated regular layer 116 which transmits at full rate. As indicated above, benefits of the half rate transmission include less overall transmission interference and less equipment.

A regular layer 116 serves the cell border and areas with high interference. As a result half rate transmission is not used here. The regular layer is used primarily to provide coverage. Therefore, the transmitters must be more robust to handle transmissions characterized by low carrier to interference ratios.

A plurality of transmitters is associated with each of the cell sites, with three transmitters 109a, 109b and 109c being shown in FIG. 1 as being associated with cell site 112c. As explained below, at least two and preferably three hopping transmitters are employed per sector and, in a preferred embodiment, at least two transmitters in the sector associated with cell site 112c, e.g., transmitters 109a and 109b are capable of operating at half-rate to address the super layer 114 and at least one further transmitter, e.g., transmitter 109c, is capable of operating at full-rate to address the regular layer 116. A controller 111 of cell site 112c controls switching between transmitters 109a, 109b and 109c, among other functions.

It will, of course, be understood that the shapes of layers 114 and 116 shown in FIG. 1 are highly schematic and would not normally be that of an ordinary circle.

With this background, returning to a consideration of IFH, as previously stated, IFH, in brief, combines simultaneously operating FH and IUO. To do so, IFH uses the GSM signal strength measurements received from the wireless receivers (e.g., corresponding to handsets 110a, 110b, and 110c of FIG. 1) to determine radio conditions, i.e., to determine the carrier to interference (C/I) ratio. These C/I ratio determinations are typically used to decide from which cell site (e.g., from which one of cell sites 112a, 112b or 112c of FIG. 1) the call is to be serviced. Additionally, in typical network operations, the call can either be serviced by the regular layer (e.g., layer 116 in FIG. 1), which is characterized by conservative loading and low efficiency transmitters (e.g., transmitter 109c of FIG. 1), or the super layer (e.g., layer 114 in FIG. 1), which is characterized by aggressive loading and high efficiency transmitters (e.g., transmitters 109a and 109b of FIG. 1).

For traditional IFH applications, a regular layer transmitter uses reduced frequencies that are infrequently reused in nearby sectors. As discussed above, regular layer transmissions therefore enjoy favorable radio conditions for the served area but are inefficient. On the other hand, a super layer transmitter uses high interference frequencies that are frequently reused in nearby sectors. These transmitters normally are effective for a smaller subset of the served area, but are more efficient and provide greater capacity. Therefore, IFH traditionally applies most of the calls to the super layer whenever the C/I ratio is adequate, with regular layer transmitters being used only where the C/I ratios are deemed inadequate for the super layer.

Considering in more detail AMR half rate, which is the other technique or technology used by the IPH system and method of the invention, this term refers to a standard GSM system and method which allows a service provider to, for example, serve 16 calls on a transmitter that normally serves 8 AMR full rate calls. Fewer half rate radios (transceivers) are therefore required to service a given amount of subscriber traffic. It will be understood that each transmitter creates interference and therefore, fewer transmitters means less interference and greater capacity. However, AMR half rate call quality is similar to AMR full rate if applied under appropriate conditions. More specifically, AMR half-rate calls require more favorable radio conditions than AMR full rate, and radio conditions in frequency hopping GSM networks deteriorate as subscriber traffic and interference reach their peak. Therefore, conventional systems tend to pack (migrate full rate to half rate) calls during peak loading periods when radios are near congestion. The margin occurs when radio conditions are least favorable to AMR half rate. Conventional systems are also unable to accurately predict radio conditions before packing and thus, half rate call quality is unpredictable. Therefore, AMR half rate is currently underutilized as a result of this inability to control the radio conditions and resulting call quality.

Turning again to the IPH method and system of the invention, in order to overcome the problems associated with the separate use of IFH and AMR half rate, Intelligent Packing for Half rate (IPH) combines the hardware and cost efficiency of AMR half rate with the spectrum efficiency and predictability of IFH. As indicated above, efficient half rate transmission are applied to the super layer and reliability is enhanced by using the C/I prediction and layer determinations of IFH. Full rate transmissions are applied to the regular layer and used to serve areas where IFH has determined radio conditions, based on C/I attenuations, to be inadequate for AMR half rate. As with IFH, transmitter resources are subdivided between super and regular layers, yet super layer half rate transmitters serve twice as many calls. As discussed above, this doubling of super layer transmitter capacity offsets the trunking efficiency loss of layer subdivision and improves hardware efficiency by a significant margin. The super and regular layer transmitters use the same pool of frequencies. As a consequence, scarce frequency resources are not subdivided between layers, therefore spectrum efficiency is optimized. As mentioned previously, the IPH method applies calls to half rate under all loading conditions, not just during peak usage periods. Therefore, the IPH method is an effective and proactive techniques which improves hardware usage, reduces cost, enhances spectrum efficiency and improves performance.

Figure 2:
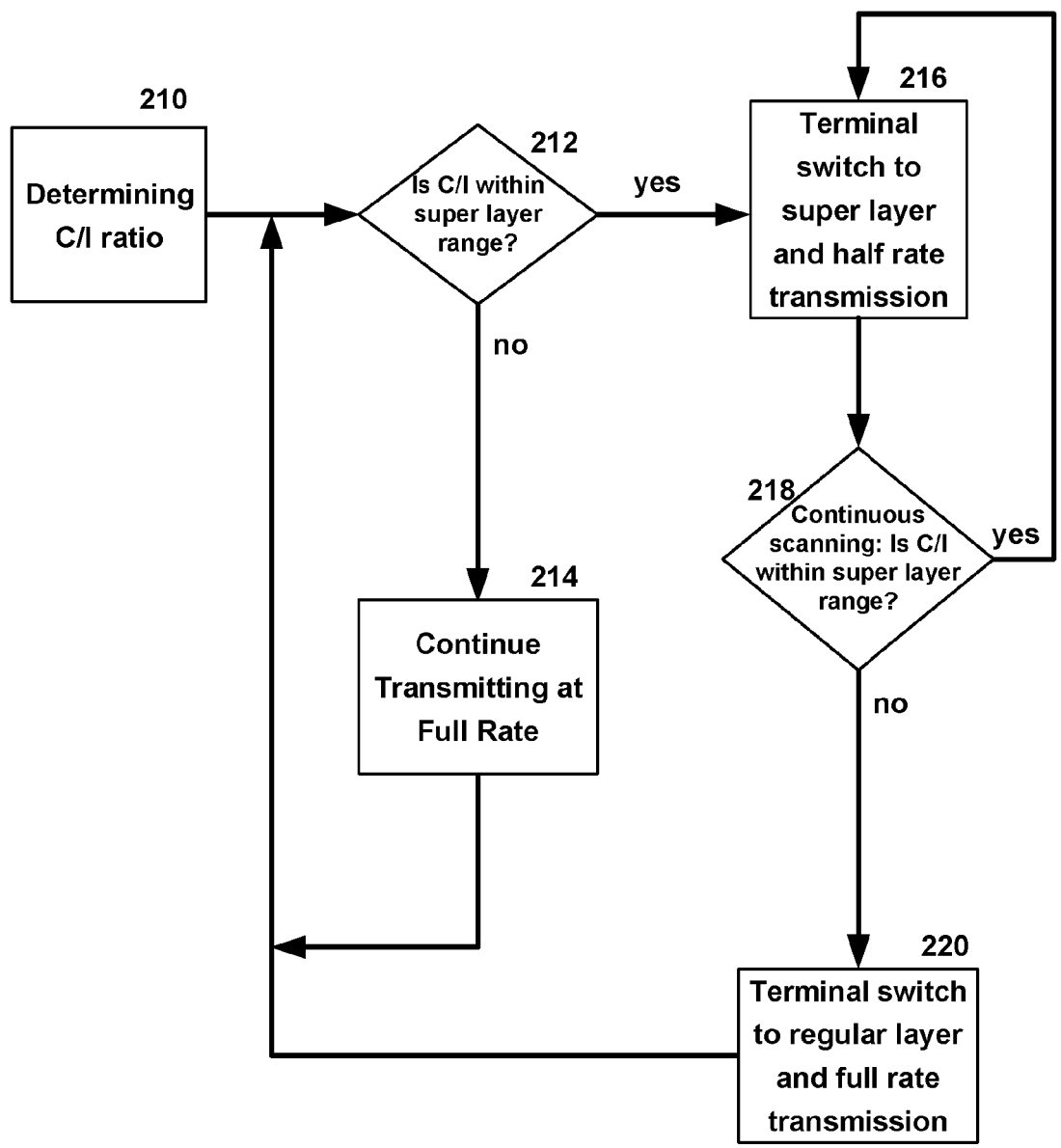
FIG. 2 is a flowchart of an exemplary embodiment of one aspect of the present invention.

Considering the operation of the IPH system and method in more detail, FIG. 2 illustrates the steps involved in one preferred embodiment of the operation. In a first step, indicated by block 210, carrier to interference (C/I) ratio values are determined based on signal strength measurements made by the associated handsets. Next, as indicated by decision diamond 212, a determination is made as to whether the C/I ratio is within the range required by, i.e., is compatible with, super layer operation. If the carrier to interference ratio is within this range, i.e., the decision is "yes," operation will then be switched or handed off from the regular layer to the super layer (assuming initial regular layer transmission) and half rate transmission will begin, as shown by block 216. However, if the carrier to interference ratio is not within the super layer range, i.e., the decision is "no," then the transmission will continue to full rate. Full rate transmission will thus continue until the C/I ratio determined is within the range needed for super layer operation.

Once operation has switched to super layer operation using a super layer transmitter operating in half rate transmission mode, there is a continuous monitoring of the carrier to interference ratio, as illustrated by decision diamond 218. If the carrier to interference ratio remains within the predetermined super layer range, i.e., the decision is "yes," the transmission will continue to occur in the super layer at half rate. However, if the carrier to interference ratio drops below the predetermined range, i.e., the decision is "no," the operation will switch back to the regular layer and full mode transmission, as shown by block 220. The continuous monitoring of the carrier to interference ratio continues throughout the operation as is shown by the arrow leaving block 220 and returning to the input of decision diamond 212.

Figure 3:
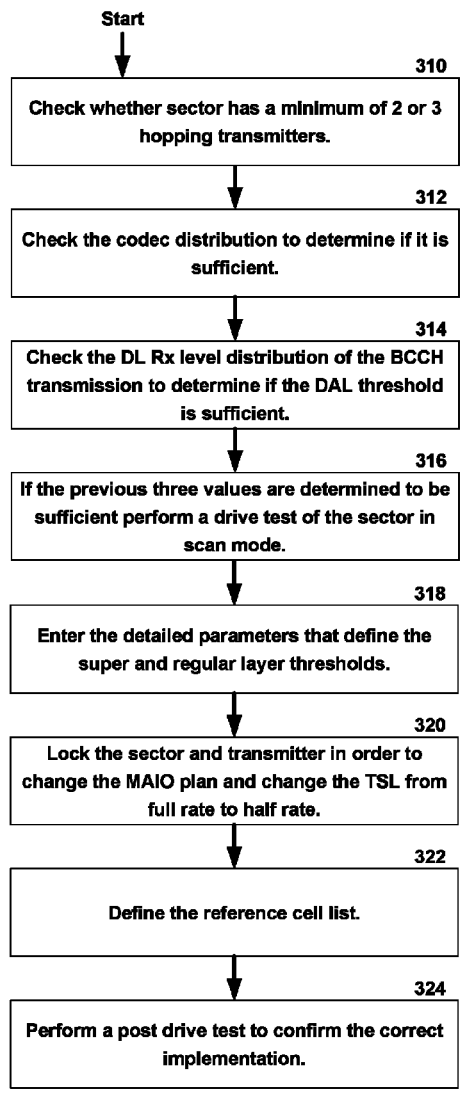
FIG. 3 is a flowchart of an exemplary embodiment of another aspect of the present invention.

Referring to FIG. 3, there is shown an illustrative sequence of an IPH implementation in accordance with an exemplary embodiment. In order to get maximum advantage from IPH, suitable transmission sectors have to be selected, and three initial tests are preferably carried out to determine whether the IPH system should be implemented in a particular sector. As shown in FIG. 3, the first step in the implementation process is making certain that the system has sufficient equipment, as illustrated by block 310. As indicated above, there is a requirement for at least two (and preferably three) hopping transmitters per sector. At least one of the transmitters in the sector will be capable of operating in full rate to address the regular layer and the other transmitter (or transmitters) in the sector will be capable of operating at half rate to address the super layer. It is noted that the sector will be unable to accept traffic on either layer if the regular layer is full, regardless of the number of idle super layer timeslots.

Next, the codec distribution must be checked to ensure that the signal is of sufficient quality for the layer in the transmission will be occurring, as shown by block 312. If the codec distribution is high, transmission at half rate is easier to achieve. More specifically, serving more than 70% of the samples on full rate codec, 12.2, makes it easier to achieve half rate using the super layer. If the codec distribution is low, then super layer transmission will not be the best method to use to transmit the signal. The codec distribution is preferably used to estimate the C/I ratio in the service area.

Once the codec distribution has been checked, the next step is to check the downlink receiver (DL Rx) level distribution of the broadcast control channel (BCCH) transmission to determine the direct access level (DAL) threshold, as illustrated by block 314. There should be a sufficient number of samples on the BCCH in order to provide a good indication of the DL Rx level without power. A significant number of samples above −85 dBm provides assurance that the mobile station will be able to keep the half rate call in good C/I conditions for quite some time. This test assures the user that the relative signal strength (e.g., C/I ratio) is adequate to be used by the IPH system for super layer half rate calls.

Once it has been determined that there is sufficient equipment and signal quality, along with adequate relative signal strength (e.g., C/I ratio) to support the super layer, a drive test is preferably performed, in scan mode, using default parameters, as shown by block 316. Drive tests can be processed to estimate the carrier to interference ratio thresholds for the super and regular layers.

Considering the drive test requirement in more detail, a thorough drive test is preferably used to monitor the performance of the test cluster. In addition to statistical data, drive tests provide information which can be further scrutinized for the purpose of identifying anomalies occurring in the network. This information can also be used to validate findings resulting from statistical and field analysis.

In preparing a drive test, a detailed drive route of the cluster is mapped. The route should ensure coverage of all sectors within the cluster. The route should also cross the boundary in several places of the test cluster. This is necessary to monitor handovers occurring between sites in and out of the test area. A baseline drive should be undertaken before any changes are implemented. This will provide a foundation on which to base the progression of the cluster. For an accurate analysis, all post change drive tests should be performed close to, or at the same time of day at which the baseline test was done. In general, the best time to conduct a drive test is during the busy hour of the test cluster. This will provide knowledge of the worst user perceived performance in the area.

Once good IPH candidate sectors are identified, implementation can take place. Referring again to FIG. 3, the next step is to lock the sector and transmitter in order to change the mobile allocation index offset (MAIO) and time slot (TSL) from full to half rate, as shown by block 320. This step is considered in more detail below, in connection with FIG. 4.

It should also be noted that for successful functioning of IPH, a proper reference cell list should be defined, as shown by block 322. The cell list is used to calculate or estimate the C/I of the cell. This is important in deciding the absorption on the super layer and the user perceived voice quality. Neighbors of the sector can only be a part of the reference cell list. There are two important factors in generating the reference cell list, viz., traffic distribution in the cell and overlapping of neighbors. Both can be very closely related to handover between adjacent cells To determine the neighbor pairs that are candidates for the reference cell list, the total number of hand over on every adjacent/neighbor sector should be determined and their cumulative percentages should be calculated. Once the cumulative percentages have been calculated the neighbors with a cumulative percentage of at least 95% are considered candidates for the reference cell list.

Lastly, to confirm correct implementation a post drive test is performed, as illustrated by block 324.

Care should be taken during the step 320 because one mistake could cause significant degradation to system performance. Therefore, in accordance with a further aspect of the invention, certain precautions should be taken. For example, the underlay MAIO step and MAIO offset should be planned as an independent sector. Further, a separate MAIO plan for the TRX of this layer should be included. In addition, the existence of full and half rate calls should be verified after implementation on a sector. Also, a conventional averaging method should be used for IUO. Further, the last TRX in the BTS should be used as the super TRX. In addition, if an interferer is suspected to be missing, the channel finder report should be run to find those cells. Once those cells are found they should be defined as neighbors and added in the TRX reference cell list.

Figure 4:
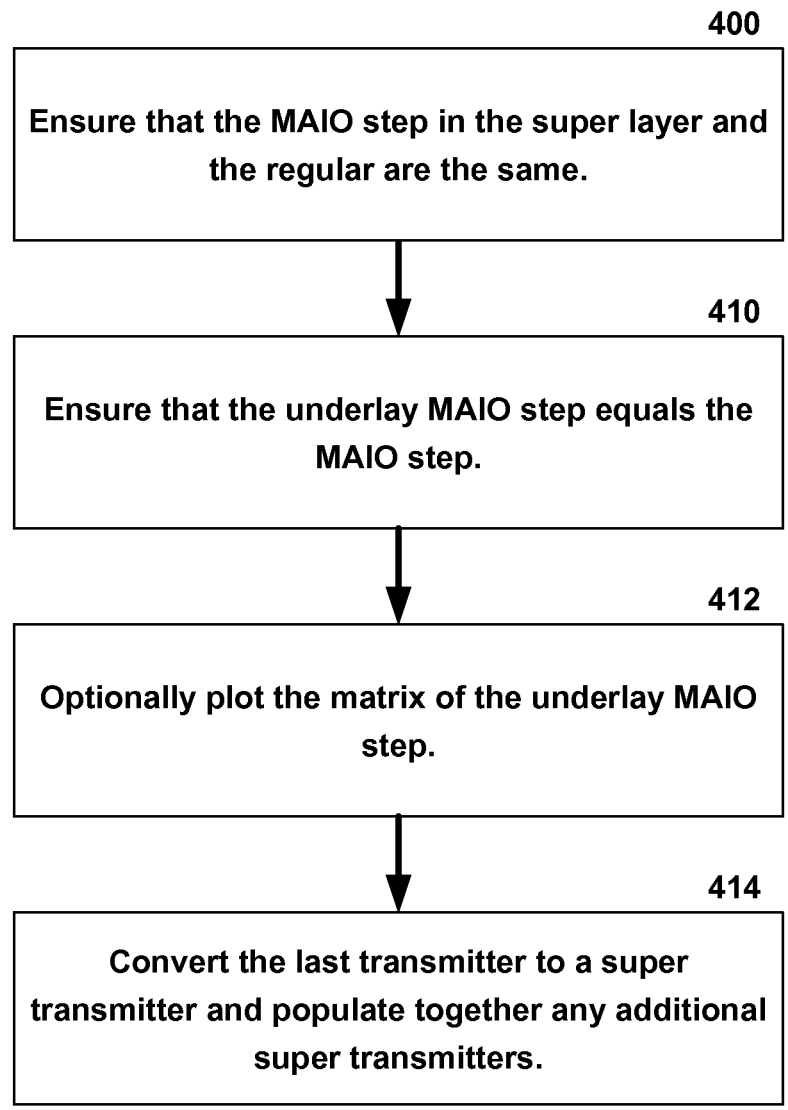
FIG. 4 is a flowchart of an example embodiment illustrative of another aspect.

Considering underlay MAIO planning in more detail, correct underlay MAIO planning is the key to a successful IPH implementation. Referring to FIG. 4, the illustrated process is preferably used to define underlay MAIO (offset) using MAIO step and MAIO (offset). For proper MAIO planning, the MAIO step in the super layer and regular layer should be the same, as shown by block 400. Next, care should be taken to ensure that the underlay MAIO step equals the MAIO step, as shown by block 410. To assist in step 410, it is helpful if the matrix of the underlay MAIO offset is plotted, as indicated by block 412. In an example, MAIO is not for the first BCCH transmitter and is only for the hopping transmitters. For instance, MAIO for every transmitter is calculated from the MAIO offset and the MAIO step. MAIO for the first hopping transmitter corresponds to the MAIO offset of a sector. MAIO for the second hopping transmitter in the same sector with the MAIO offset added to the MAIO step (e.g., 0+3=3) and, similarly, MAIO for any additional transmitter is incremented by the MAIO step (e.g., 3) so that, in the example, for third hopping transmitter MAIO is 6 (e.g., 3+3=6). For the ease of underlay MAIO planning, the last transmitter should be converted to a super transmitter, as shown by block 414, and any additional super transmitter should be populated together.

Although the invention has been described above in relation to preferred embodiments thereof, it will be understood by those skilled in the art that variations and modifications can be effected in these preferred embodiments without departing from the scope and spirit of the invention

What is claimed is:

1. A method, comprising:
in response to a number of frequency hopping transmitters, an amount of codec distribution, and a direct access level in a transmission sector being determined to be within a first predetermined threshold, a second predetermined threshold and a third predetermined threshold, respectively,
drive testing, by a system comprising a processor, the transmission sector in a scan mode based on a default parameter to determine an estimated carrier to interference ratio threshold for a super layer frequency hopping transmitter and a regular layer frequency hopping transmitter;
locking, by the system, the transmission sector; and
changing, by the system, a mobile index offset and a time slot from full rate to half rate for the super layer frequency hopping transmitter.

2. The method of claim 1, further comprising:
measuring, by the system, the number of frequency hopping transmitters in the transmission sector; and
determining, by the system, whether the number of frequency hopping transmitters in the transmission sector is within the first predetermined threshold.

3. The method of claim 1, further comprising:
measuring, by the system, the amount of codec distribution in the transmission sector; and
determining, by the system, whether the amount of codec distribution in the transmission sector is within the second predetermined threshold.

4. The method of claim 1, further comprising:
measuring, by the system, a downlink receiver level distribution of a broadcast control channel of the transmission sector to determine the direct access level; and
determining, by the system, whether the direct access level is within the third predetermined threshold consistent with a signal strength for super layer half rate calls.

5. A method according to claim 1, wherein the drive testing comprises includes at least one of mapping a defined drive route of the transmission sector.

6. A method according to claim 1, further comprising defining, by the system, a reference cell data structure.

7. A method according to claim 6, wherein the defining comprises defining the reference cell data structure based on a traffic distribution determined for the transmission sector.

8. A method according to claim 1, further comprising unlocking, by the system, the transmission sector and performing, by the system, a second drive test of the transmission sector.

9. A method according to claim 8, wherein the second drive test comprises mapping a defined drive route of the transmission sector.

10. A method according to claim 8, further comprising determining, by the system, whether the second drive test satisfies a function of a fourth predetermined threshold for implementation of an intelligent packing half-rate system.

11. A system, comprising:
a memory to store instructions; and
a processor, coupled to the memory, that facilitates execution of the instructions to perform operations, comprising:

receiving a number of frequency hopping transmitters, an amount of codec distribution, and a direct access level in a transmission sector;

responsive to the receiving,
performing a drive test in a scan mode based on a default parameter to determine an estimated carrier to interference ratio threshold for a super layer frequency hopping transmitter and a regular layer frequency hopping transmitter;
locking the transmission sector; and
changing a mobile index offset and a time slot from full rate to half rate for the super layer frequency hopping transmitter.

12. The system of claim 11, wherein the operations further comprise determining whether the number of frequency hopping transmitters in the transmission sector is within a first predetermined threshold.

13. The system of claim 11, wherein the operations further comprise determining whether the amount of codec distribution in the transmission sector is within a second predetermined threshold.

14. The system of claim 11, wherein the operations further comprise:
measuring a downlink receiver level distribution of a broadcast control channel of the transmission sector to determine the direct access level; and
determining whether the direct access level is within a third predetermined threshold consistent with a signal strength for super layer half rate calls.

15. The system of claim 11, wherein the operations further comprise accessing reference cell data representing a reference cell list.

16. The system of claim 15, wherein the operations further comprise generating the reference cell data representing the reference cell list based on an amount of overlap determined to be present for neighboring transmission sectors within a defined proximity to the transmission sector.

17. The system of claim 11, wherein the operations further comprise:
unlocking the transmission sector;
performing a second drive test of the transmission sector that conducts a defined baseline drive route of the transmission sector.

18. The system of claim 17, wherein the second drive test determines whether a fourth predetermined threshold for implementation of an intelligent packing half-rate system is satisfied.

19. A non-transitory computer-readable storage device comprising instructions that, in response to execution, cause a system comprising a processor to perform operations, comprising:
first determining that a number of frequency hopping transmitters is within a first predetermined threshold;
second determining that an amount of codec distribution is within a second predetermined threshold;
third determining that a direct access level in a transmission sector is within a third predetermined threshold;
responsive to a result of the first determining, the second determining and the third determining,
drive testing the transmission sector in a scan mode based on a default parameter to determine an estimated carrier to interference ratio threshold for a super layer frequency hopping transmitter and a regular layer frequency hopping transmitter;
locking the transmission sector; and
changing a mobile index offset and a time slot from full rate to half rate for the super layer frequency hopping transmitter.

20. The non-transitory computer-readable storage device of claim 19, wherein the operations further comprise performing a drive test that conducts a defined baseline drive route of the transmission sector.

* * * * *